No. 800,238. PATENTED SEPT. 26, 1905.
W. H. OWEN.
CHANGE OF SPEED DEVICE FOR MILLING MACHINES.
APPLICATION FILED FEB. 29, 1904.

2 SHEETS—SHEET 2.

UNITED STATES PATENT OFFICE.

WILLIAM H. OWEN, OF SPRINGFIELD, OHIO, ASSIGNOR TO THE OWEN MACHINE TOOL COMPANY, OF SPRINGFIELD, OHIO, A CORPORATION OF WEST VIRGINIA.

CHANGE-OF-SPEED DEVICE FOR MILLING-MACHINES.

No. 800,238. Specification of Letters Patent. Patented Sept. 26, 1905.

Application filed February 29, 1904. Serial No. 195,733.

*To all whom it may concern:*

Be it known that I, WILLIAM H. OWEN, a citizen of the United States, residing at Springfield, in the county of Clark and State of Ohio, have invented certain new and useful Improvements in Change-of-Speed Devices for Milling-Machines, of which the following is a specification.

My invention relates to improvements in a milling-machine.

My object is to devise improved connections for the speed device used for regulating changes of speed in the feed of the machine.

My particular improvement consists in a series of clutches and gears connected from the cone-pulley of the machine to the table which dispense with the complicated connections heretofore used and provide for a multiplicity of changes of speed.

Figure 1:
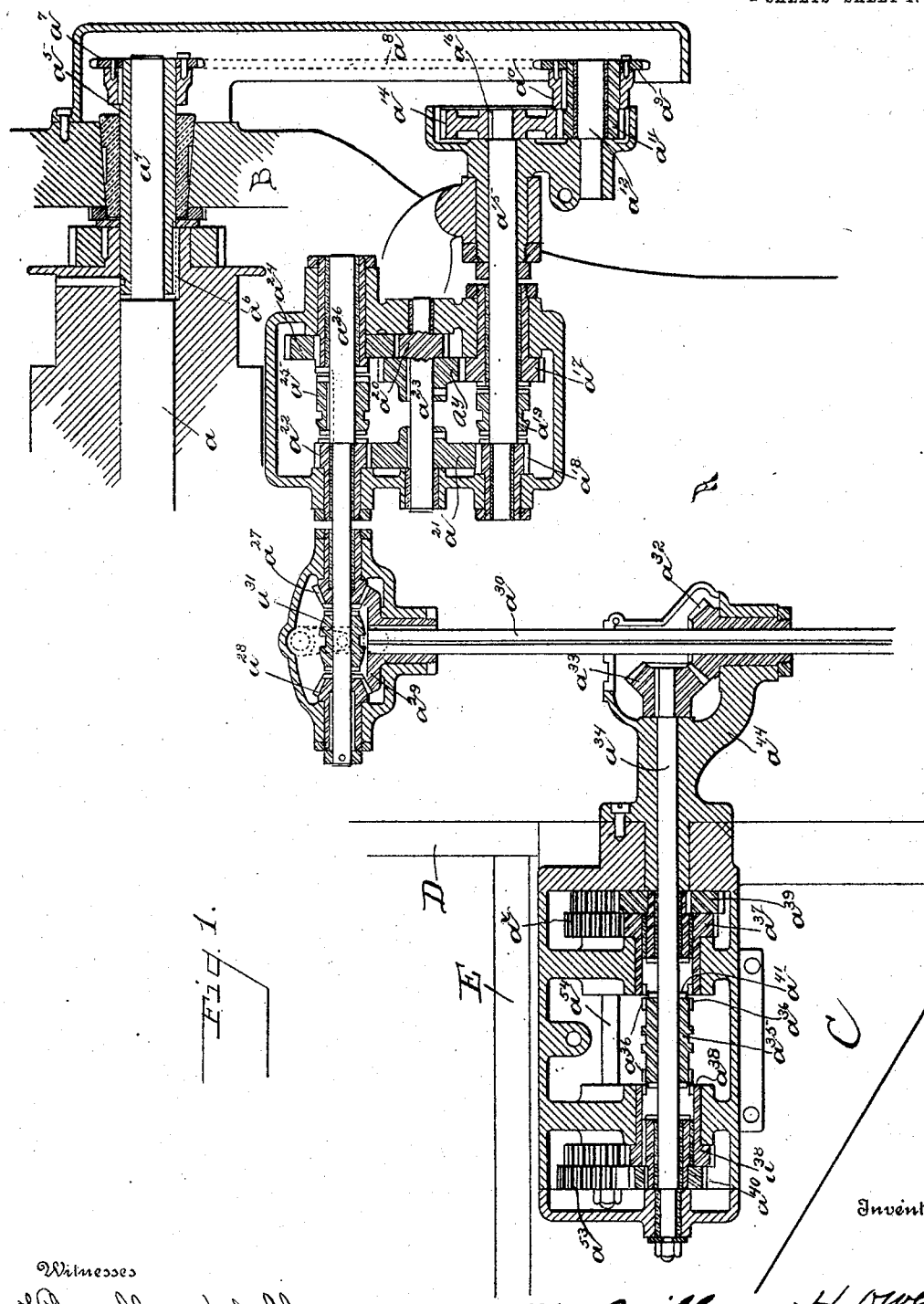
Figure 2:
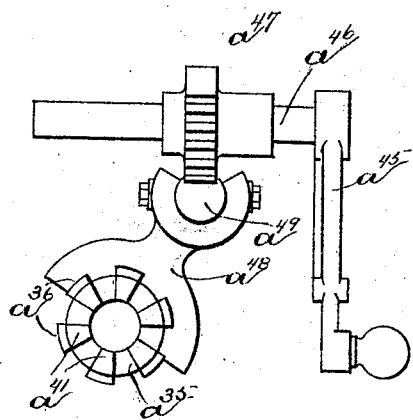
Figure 3:
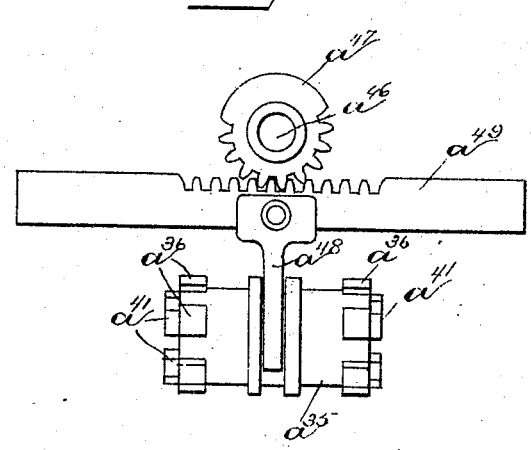

In the drawings, Figure 1 is a sectional view showing the connection between the cone-pulley and the table. Figs. 2 and 3 are detail views of part of the clutch mechanism for change of speed of the speed device.

Like letters of reference indicate like parts throughout the several views.

I have shown in Fig. 1 a base and main frame of the machine, lettered A. There is an upper frame part, (indicated by B.) The knee of the supporting-table is lettered C. Guides (marked D) are formed in the side of the frame A, and the knee is fitted within the guides D, so that in its vertical movement it is guided by means of the guides D. The table which supports the article to be milled is supported by the knee C and is lettered E.

The shaft of the machine for operating the cutting-tool is indicated by $a$, Fig. 1. The shaft $a$ at one end is formed with a reduced section $a^4$, and there is journaled loosely on said section $a^4$ a sleeve $a^5$, through which power is transmitted. At the outer end of the reduced section $a^4$ there is rigidly placed on said sleeve a sprocket-wheel $a^7$, which rotates with said sleeve. The sprocket-wheel is geared by a sprocket-chain $a^8$ to a sprocket-wheel $a^9$, which is formed rigid with a sleeve $a^{10}$, which sleeve $a^{10}$ is keyed on an inner sleeve $a^{11}$, which is journaled loosely on the stub-shaft $a^{12}$. Said inner sleeve $a^{11}$ is geared to a gear $a^{14}$, which is keyed on the shaft $a^{15}$, as indicated at $a^{16}$ in Fig. 2. Said shaft $a^{15}$ is journaled in bearings in the frame of the machine, and there is journaled loosely thereon near the opposite end of the shaft from the gear $a^{14}$ two gears $a^{17}$ and $a^{18}$, and formed between these gears is a clutch member $a^{19}$, keyed to said shaft $a^{15}$. Said clutch member is formed to engage either of said gears and is shown so formed that when it is thrown to the right it will engage the gear $a^{17}$ and when thrown to the left it will engage the gear $a^{18}$. The gear $a^{17}$ is shown in the machine in mesh with an intermediate gear $a^{20}$, formed rigid on the stub-shaft $a^{23}$. This intermediate gear is in mesh with an upper gear $a^{24}$. The gear $a^{18}$ gears with an intermediate gear $a^{21}$, which is shown in mesh with an upper gear $a^{22}$. Between the two gears $a^{22}$ and $a^{24}$ there is shown a clutch member $a^{25}$, which is keyed to the shaft $a^{26}$, on which shaft are journaled loosely the gears $a^{22}$ and $a^{24}$. The gear $a^{17}$ is shown larger in diameter than the gear $a^{18}$, which is a comparatively small gear; but $a^{18}$ gears with $a^{21}$, which is a large gear-wheel keyed on said shaft $a^{23}$, and $a^{21}$ in turn gears with a small gear-wheel $a^{22}$. On the other hand, $a^{17}$ being a gear of large diameter is adapted to gear with a gear $a^y$, keyed on the shaft $a^{23}$, which shaft has the gear $a^{20}$ journaled thereon, which in turn gears with a large gear $a^{24}$. By this arrangement when the clutch member $a^{19}$ is thrown to the right there will be an entirely different speed transmitted than when the clutch member $a^{19}$ is thrown to the left. By the arrangement of the upper gear and the clutch member $a^{25}$ the changes of speed are clearly shown to be multiplied, for the speed of the shaft $a^{26}$ will be varied by throwing the clutch member $a^{25}$ to the right or left. Said shaft $a^{23}$ is journaled loosely in bearings in the frame of the machine and is rotated by either gear $a^{20}$ or $a^{21}$. The operator of the machine may throw the clutch members $a^{19}$ and $a^{25}$ simultaneously, or one may be thrown to the right and the other to the left, and in this way the change of speed is varied. On the opposite end of the shaft $a^{26}$ from the end where the clutch member $a^{25}$ is located there is splined on said shaft another clutch $a^{31}$, which is adapted to gear with either of the bevel-gears $a^{27}$ or $a^{28}$. When the clutch member $a^{31}$ is thrown to the right, the shaft $a^{27}$ being in mesh with the corresponding gear member $a^{29}$, which gear member is formed rigid with the shaft $a^{30}$, rotates said shaft $a^{30}$ in one direction, and when the clutch member $a^{31}$ is thrown to the left said shaft $a^{26}$, through the gear $a^{28}$ and the corresponding gear member $a^{29}$, rotates the shaft $a^{30}$ in the opposite direction. Near the lower end of said shaft $a^{30}$ is formed a gear member $a^{32}$, rigid with said shaft, and this gear member $a^{32}$ meshes with a corresponding gear member $a^{33}$, which is keyed on the shaft $a^{34}$. Said shaft $a^{34}$ extends through bearings formed in the frame A, and near the end opposite from the gears $a^{32}$ and $a^{33}$ there are loosely journaled on said shaft a series of gear-wheels. At the extreme opposite end from said gear members $a^{32}$ and $a^{33}$ there is a second series of gear-wheels, and between these two series of gear-wheels there is formed a clutch member $a^{35}$, which is keyed on the shaft $a^{34}$. Said clutch member is formed with teeth on the outer surface or periphery, (marked $a^{36}$,) and on the end surfaces of said clutch member there are formed gear-teeth $a^{41}$. When the clutch member $a^{35}$ is thrown to the right, the teeth $a^{36}$ on the outer periphery of the clutch member are adapted to engage two teeth formed on the inner surface of the gear member $a^{37}$, which gear member is journaled loosely on a sleeve projecting from the inner gear member $a^{39}$, which gear member in turn is journaled loosely on the shaft $a^{34}$. When the clutch member $a^{35}$ is thrown to the left, the teeth $a^{36}$ on the outer periphery of said clutch member are adapted to engage with two teeth on the inner surface of the gear member $a^{38}$, which is journaled loosely on the sleeve projecting from the inner gear member $a^{40}$, which gear member in turn is journaled loosely on the shaft $a^{34}$. The gear members $a^{37}$ and $a^{38}$ are shown in mesh with gears formed rigid on the shaft $a^{54}$, and the gear members $a^{39}$ and $a^{40}$ are also shown in mesh with gears rigid on said shaft $a^{54}$. The inner gear is indicated by $a^{53}$. It will be noticed that the gear members $a^{37}$ and $a^{39}$, $a^{38}$ and $a^{40}$ are shown of varying sizes, so that there is a change of speed transmitted to the shaft $a^{54}$, depending on which gear member the clutch member $a^{35}$ gears with. In order to cause the clutch member $a^{35}$ to gear with the inner gears $a^{39}$ and $a^{40}$, it is necessary to throw the clutch member $a^{35}$ to the extreme of its right or left movement, and when this is done the teeth $a^{41}$ mesh with teeth formed on the end surfaces of said inner gear, and the teeth on the inner surfaces of the gear members $a^{37}$ and $a^{38}$ are adapted to extend within the spaces formed between the teeth on the outer surface of said clutch $a^{35}$.

There is the usual connection between the shaft $a^{54}$ and the device to be operated or moved.

Any usual lever, such as $a^{45}$, may be employed for throwing the clutch member in Fig. 2, (indicated by the reference character $a^{35}$.) When the lever is thrown in one direction, the clutch member $a^{35}$ will be in gear with the gear member $a^{37}$, and when the lever $a^{45}$ is further thrown in the same direction the clutch member $a^{35}$ will be in gear with the gear member $a^{39}$, and in the same manner when the lever is thrown in the other direction the clutch member $a^{35}$ will be thrown into gear with the gear members $a^{38}$ and $a^{40}$. Levers for clutch member $a^{31}$ may also be employed.

In Figs. 2 and 3 I have shown the connecting mechanism between the lever $a^{45}$ and the clutch $a^{35}$. The lever operates the shaft $a^{46}$, having a hub $a^{47}$, which gears with the rack $a^{49}$. The clutch-arm $a^{48}$ is connected to said rack.

Having thus described my invention, I claim—

1. In a milling-machine, a change-of-speed device consisting of a clutch member with all its surfaces formed with spurs or teeth, and gears located opposite to each end of said clutch member, and means for causing the teeth on said gears to engage teeth on different surfaces of said clutch member.

2. In a milling-machine, a change-of-speed device consisting of a cylindrical clutch member having teeth on its end surfaces and on its peripheral surfaces, a plurality of gears, some of which are adapted to engage with the teeth on the end surfaces and some adapted to engage with the teeth on the periphery of said clutch member.

3. In a milling-machine, a change-of-speed device consisting of a clutch member, a plurality of gears opposite one end of said clutch member consisting of an outer and inner gear, teeth formed on the inner surface of said outer gear and on the end surface of said inner gear, and means for causing the clutch member to engage with the teeth of said outer gear when thrown into one position and with the teeth of the inner gear when thrown an additional distance.

4. In a milling-machine, a clutch member with teeth formed on all its surfaces, means for throwing said clutch member to the right and to the left, a plurality of gears opposite each end of said clutch member consisting of outer and inner gears, teeth formed on the inner surface of the outer gear and on the end surface of the inner gear, said teeth on said outer gear being adapted to pass within the spaces formed between the teeth on the outer surface of the clutch member when the teeth on the end surface of said clutch member engage with the teeth on the end of said inner gear, for the purpose specified.

In testimony whereof I have hereunto set my hand this 25th day of February, A. D. 1904.

WILLIAM H. OWEN.

Witnesses:
 CHAS. I. WELCH,
 CLIFTON P. GRANT.